US009792292B1

(12) United States Patent  
Bynum (10) Patent No.: US 9,792,292 B1  
(45) Date of Patent: Oct. 17, 2017

(54) METHOD AND SYSTEM FOR A NETWORK MAPPING SERVICE

(71) Applicant: Sandia Corporation, Albuquerque, NM (US)

(72) Inventor: Leo Bynum, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 325 days.

(21) Appl. No.: 14/054,035

(22) Filed: Oct. 15, 2013

Related U.S. Application Data

(60) Provisional application No. 61/721,765, filed on Nov. 2, 2012.

(51) Int. Cl.
*G06F 17/30* (2006.01)

(52) U.S. Cl.
CPC .............. *G06F 17/30165* (2013.01)

(58) Field of Classification Search
None
See application file for complete search history.

(56) References Cited

U.S. PATENT DOCUMENTS

| | | | |
|---|---|---|---|
| 2003/0093643 A1* | 5/2003 | Britt, Jr. .................. | G06F 8/68 711/170 |
| 2004/0187112 A1* | 9/2004 | Potter, Jr. .............. | G06F 9/4843 718/100 |
| 2007/0273558 A1* | 11/2007 | Smith .................. | G09B 29/007 340/995.1 |
| 2009/0024649 A1 | 1/2009 | Broder et al. | |
| 2010/0083124 A1 | 4/2010 | Druzgalski et al. | |

FOREIGN PATENT DOCUMENTS

WO    WO 2014/070446 A2    8/2014

OTHER PUBLICATIONS

ESRI Shapefile Technical Description White Paper, Jul. 1998, Published by Environmental Systems Research Institute, Inc. of Redlands, CA, pp. 1-36.
International Search Report and Written Opinion from PCT/US2013/065050 mailed Apr. 16, 2014, now International Publication No. WO 2014/070446, published on May 8, 2014.

* cited by examiner

*Primary Examiner* — Belix M Ortiz Ditren
(74) *Attorney, Agent, or Firm* — Daniel J. Jenkins (57) ABSTRACT

A method and system of publishing a map includes providing access to a plurality of map data files or mapping services between at least one publisher and at least one subscriber; defining a map in a map context comprising parameters and descriptors to substantially duplicate a map by reference to mutually accessible data or mapping services, publishing a map to a channel in a table file on server; accessing the channel by at least one subscriber, transmitting the mapping context from the server to the at least one subscriber, executing the map context by the at least one subscriber, and generating the map on a display software associated with the at least one subscriber by reconstituting the map from the references and other data in the mapping context.

23 Claims, 8 Drawing Sheets

METHOD AND SYSTEM FOR A NETWORK MAPPING SERVICE

CROSS-REFERENCE TO RELATED APPLICATIONS

This application claims the benefit of U.S. Provisional Patent Application 61/721,765, entitled METHOD AND SYSTEM FOR A NETWORK MAPPING SERVICE, filed Nov. 2, 2012, which is incorporated herein by reference in its entirety.

STATEMENT REGARDING FEDERALLY SPONSORED RESEARCH OR DEVELOPMENT

This invention was developed under Contract DE-AC94AL-85000 between Sandia Corporation and the U.S. Department of Energy. The U.S. Government has certain rights in this invention.

FIELD OF THE INVENTION

The present invention is directed to mapping services, and more specifically to an Internet communication and mapping service for subscribers.

BACKGROUND OF THE INVENTION

Mapping applications currently exist for use by mobile devices and portable computing devices which provide visual images of a geographic area to be displayed on such devices. Mapping applications may display street maps, topographic maps, or satellite images and provide navigational assistance such as a route planner for travelling.

Some mapping applications provide geospatial data identifiers, such as pushpins, which identify geospatial data to be displayed on a map. Geospatial data includes data which is related to geographic and/or spatial information. Geospatial data may pertain to a location of a feature, which may be natural or constructed. Such features may include, for example, objects, businesses, or structures.

At times, such as during a natural disaster such as a hurricane or earthquake, there is a need to quickly identify infrastructure and assets to coordinate many resources such as emergency evacuation or rescue operations, electrical power grids, police, communications, and various other facilities. In addition, at such times there may be a need to collaboratively create and share customized geospatial information over the Internet or a secure network.

There is a need for a mapping system that provides for publishing, sharing, and collaborative modification of mapping and geospatial or location-based data and visualizations. Also, there is a need to separate and or categorize geospatial information; by subject, or application, or other common use. Also, there is a need to order mapping, geospatial, and location-based information; by time, or other ordered hierarchy. Also, there is a need to access such published mapping, geospatial, and location-based information; either historically or currently posted or published by said categorizations, and in said orderings.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The map channel system uses internet communication, mapping services and/or database servers to allow a user to browse a map, add subject areas to the map (e.g. roads, pipelines, airports, hospitals, vehicle tracks, or any other geospatial data), overlay an area of interest (e.g. flood areas, earthquake areas, arbitrary proximity areas), identify items in the added subject areas, report and list items in the added subject areas, and print or publish the context of the map to subscriber users through a channel. Subscriber users monitoring a channel will automatically have the published maps loaded into their own running map display software where they can further browse, query, change, and republish a new or updated map including labels, legend, title, as well as additional or removed subject areas, areas of interest, or identified items mentioned above back to the same or any other channel. The disclosed system may be used to distribute to subscribers situational information about locations and proximities of entities, assets, infrastructure, properties, persons, vehicles or events. The disclosed system may also be used to communicate such information unilaterally, i.e., broadcast mode, or multilaterally, i.e., collaborative mode, with information being disseminated and or collaboratively updated to provide static or developing situational awareness to participating parties. The disclosed system provides for basic messaging when new content is available.

In one embodiment, a method of publishing a map context is disclosed. The method includes providing access to a plurality of map data sources between at least one publisher and at least one subscriber; defining a map in a map context comprising parameters and descriptors to substantially duplicate a map; and publishing a map context to a channel through a table on a server.

In another embodiment, a Geographical Information Systems (GIS) mapping system is disclosed for disseminating a map context between users. The mapping system includes a server for maintaining a table containing at least one map context. The server is in data communication with at least one publisher and at least one subscriber. The publishers and subscribers are in data communication with one or more mapping services. The server is arranged to receive map context from a publisher and to transmit the context to authorized subscribers. The publisher may upload the at least one map context to the server. The map context includes parameters and descriptors required to create the map. The map context is readable, or executable, by subscribers to display or to reconstitute the map based on the map context. The channel is modifiable by a user (publisher and/or subscriber) and the channel as modified is traceable sequentially through each modification to the channel. A user can retrieve, add, modify, delete, or reorder individual contexts published to a channel.

Certain advantages of the embodiments described herein include the ability to instantly share, not just textual or image/pictoral information pertaining to a situation or location based event with subject content, and annotations (titles, labels, etc.), but to be able to share the full exact map itself, including all dynamic abilities to pan, zoom, modify content, and republish repeatedly across unlimited numbers of groups through unlimited discrete channels. This allows users to plan, make logistical decisions, or to collaborate on any problem, need, or informative function by being able to share the full function, content, context and capabilities, live and in a broadcast/push environment.

Other features and advantages of the present invention will be apparent from the following more detailed description of the preferred embodiment, taken in conjunction with the accompanying drawings which illustrate, by way of example, the principles of the invention.

The figures depict embodiments of the present invention for purposes of illustration only, and are not necessarily drawn to scale. One skilled in the art will readily recognize from the following discussion that alternative embodiments of the structures and methods illustrated herein may be employed without departing from the principles of the invention described herein.

DETAILED DESCRIPTION OF THE INVENTION

It should be understood that the application is not limited to the details or methodology set forth in the following description or illustrated in the figures. It should also be understood that the phraseology and terminology employed herein is for the purpose of description only and should not be regarded as limiting.

Figure 1:
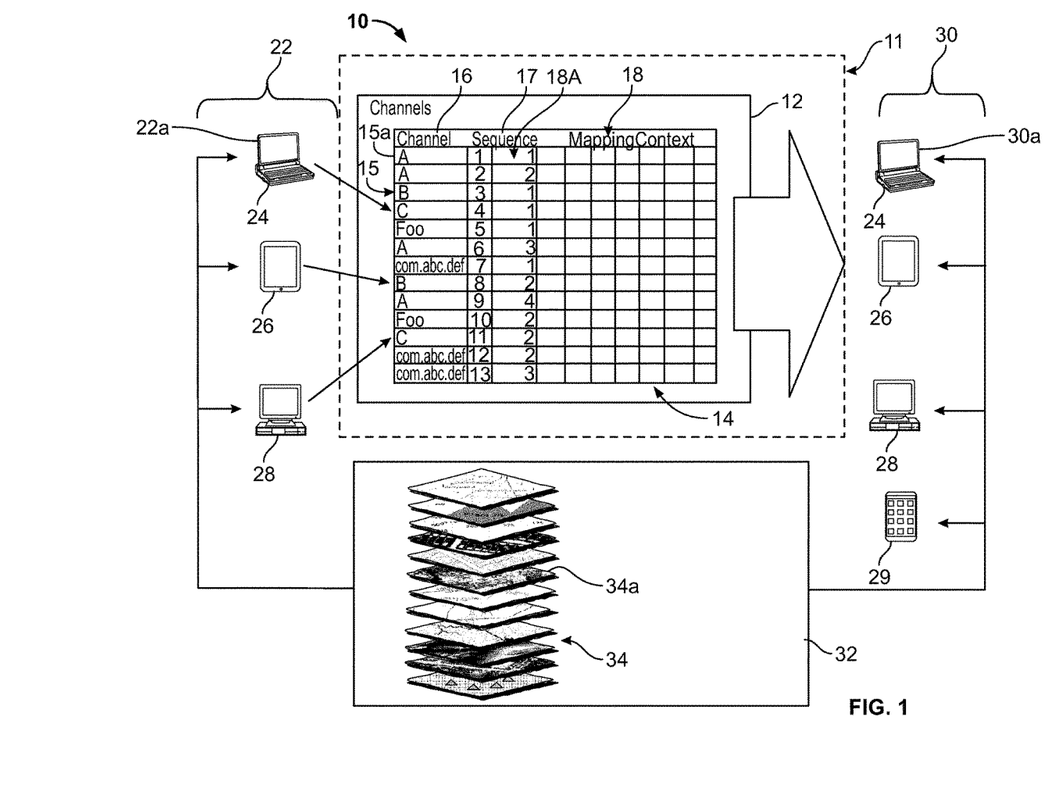
FIG. 1 shows an embodiment of a mapping system according to the present invention.

FIG. 1 is an illustration of an embodiment of a mapping system 10 according to the present invention. The mapping system 10 includes a server 12. In another embodiment, the mapping system 10 may include one or more servers. Server 12 may be a web or file server. Server 12 maintains a database in the form of a table 14 in which server 12 maintains or stores one or more maps 15.

Mapping system 10 is operated by a mapping system administrator 11. The mapping system administrator 11 can add, change, reorder, or delete mapping contexts and the channel to which they are assigned. The mapping administrator can also grant permissions for users to access, and/or publish to any individual channel(s).

A single map 15a is constituted by a row of table 14 and includes a channel designator 16, a sequence number 17 and one or more mapping contexts 18. It should be appreciated that the "visual" map 15a is not present in the table 14, but the "components" of the map 15a, such as, but not limited to describing sources, composition and layout of the map 15a, herein referred to collectively as "mapping context 18" are present. In such a manner, a visual map is available to a user of the system when the mapping context 18 is downloaded and reconstituted. In this example, the mapping context 18 is contained in a single row of the table, however, it should be appreciated by one of ordinary skill in the art that the information may be contained in any associated format.

The channel designator 16 is a map attribute that identifies by channel name a sequence of one or more maps having a common theme, area of interest, target audience, or other arbitrary grouping as deemed by the publishing users and/or mapping system administrator.

The sequence number 17 is another map attribute that uniquely identifies a map within a channel. In this exemplary embodiment, the sequence of numbering is consecutive and indicates the order in time of when a map was uploaded or appended to a channel in the mapping system. In another embodiment, the numbering may indicate another ordering to the maps as desired of a channel. For example as shown in FIG. 1, Channel A, Sequence 1 was uploaded and then Channel A, Sequence 2 was uploaded at a later time. Alternatively, maps may be uploaded to a channel and subsequently renumbered to organize the maps by subject, location or other useful ordering. Maps in a channel having a different sequence may be different in any one of, but not limited to, the following ways:

a. Updated Information
b. Additional Information
c. Revised Information
d. Corrected Information
e. New information Mapping contexts 18, represented by seven fields (open boxes), one or more of which contain a set of parameters and or instructions or code for forming or constructing maps 15. For example, Channel A, Sequence 1 is shown as the first row in the table 14 with 7 mapping context fields containing mapping contexts 18 that would include parameters, code, sources, layout, and/or instructions for forming the map known as Channel A, Sequence 1.

Mapping contexts 18 may include parameters such as, but not limited to map center and/or extent coordinates (may be referred to as map location bounding box), map scale and/or zoom level, map title, map legend construction, map sources (including references to internet mapping services) overlay transparency values, and other map information or metadata necessary to construct a desired map.

Mapping contexts 18 may further include references to a mapping service 32 such as internet mapping services or other GIS data sources for further forming or constructing maps 15. The mapping contexts 18 identify and describe the manner in which any of the mapping service 32 are accessed or filtered to be included in the map. Mapping contexts 18 may include instructions, references, or code for retrieving map information such as, but not limited to a basemap, references to a mapping service(s), and other map information and/or retrieval code necessary to access data and construct a desired map. Mapping services 34 provide subject layers to maps 15. Map services can be used as overlays that may include, but are not limited to maps of streets, topography, satellite views, as well as subject maps such as, but not limited to electric power grid, electric power transmission lines and substations, police stations, police car locations, fire stations, natural gas network, houses for sale, weather, people or asset locations.

Basemaps and map overlay(s) may be retrieved from online internet mapping services or by any mapping service provider by one or more mapping contexts 18 by referencing the mapping service 32. The mapping service 32 may be public and/or private online sources that provide map information or images 34 including map overlays 34A. Mapping service 32 may be collocated on server 12 (i.e. the same server as the mapping system) or may collectively or individually reside on servers elsewhere.

Publicly available mapping services are known to those skilled in the art, and are used, e.g., to acquire detailed street maps, satellite imagery, or other geospatial functions, e.g., by accessing a known service through a URL or web address. Street, satellite, topographic and other basemaps may be located on large public servers. It should be understood that the network architecture includes other components that are not shown in order to simplify the drawings.

Publishers 22 upload maps 15 to server 12. Publishers 22 may need permission credentials to upload maps 15 to server 12. In an embodiment, a publisher 22a may need permission from the mapping system administrator 11 to publish a map 15a. In an embodiment, publishing permission may be granted based on the user login. Publishers 22 may publish to more than one channel at a time, if desired, e.g., by adding the same identical row multiple times, with each of the multiple rows assigned a different channel name. In another embodiment, the channel attribute may be expanded to enumerate multiple channels or a list of channels upon which to publish maps.

In this exemplary embodiment, there are three publishers, first publisher 24, second publisher 26 and third publisher 28. In another embodiment, there may be one or more publishers. Publishers 22 operate various computer devices including applications configured to access mapping services 34 and to upload and download mapping contexts 18 to and from the mapping system 10 to form maps 15. In this exemplary embodiment, publisher 24 is using a laptop, publisher 26 a computer tablet, and publisher 28 a personal computer (PC). In another embodiment, publishers 22 may use laptops, tablets, personal computers (PC), smart phones with data communication links to server 12. The data communications link may be wireless or wired networks.

Publishers 22 have access to mapping service 32 that provides map information 34. In another embodiment; publishers 22 may have access to one or more mapping services. In another embodiment, publishers 22 may have their own map information.

Publishing is accomplished by adding mapping context 18 tagged with a channel name, sequence, to form a map 15 which is added to the mapping system 10. Publishing may be accomplished by an individual publisher using mapping system client software via client-server or peer-to-peer messaging or it may be accomplished by adding mapping contexts directly to the mapping system; either manually or in an automated fashion, without direct involvement of an individual publisher.

To utilize the mapping system 10, a publisher 22a creates a map 15a having one or more set of parameters that can be compiled describing the map, its content, location, and layout. These parameters collectively constitute a mapping context 18 and the mapping system 10 tags the map 15a with the name of the channel to which the map 15a is to be posted. In an embodiment, a publisher 22a may communicate or share one or more maps 15 by communicating or sharing corresponding mapping contexts with map display software operating on subscriber or publisher devices 30, 22, such that a new map is created based on the communicated or shared context.

Subscribers 30 are users or user devices that monitor one or more channels. A channel is a collection of maps having the same channel attribute i.e. A, B, C, Foo, etc. In other words, a channel is composed of an ordered collection of maps (ordered by sequence number) with each assigned a common channel name. Downloading newly added mapping contexts is required for subscribers 30 to monitor a channel. Subscribers 30 may also be publishers 22. Subscribers 30 may be required to have security authorization or permission to monitor one or more channels, and to publish to one or more channels. In an embodiment, any one of the subscribers 30 may monitor more than a single channel at a time. Subscribers 30 can also view previously added maps by downloading previously added mapping contexts, either explicitly by sequence number, or by iterating forward or backward through the ordered list of mapping context that compose a channel.

Subscribers 30 may operate various computer devices including applications configured to upload and download mapping contexts 18 to and from the mapping system 10 to form maps 15. In this exemplary embodiment, subscribers 30 include a first subscriber 24 using a laptop computer, a second subscriber 26 using a computer tablet, and a third subscriber 28 using a PC. In another embodiment, there may be one or more subscribers using any computer device, such as, but not limited to laptop computing devices, tablet computing devices, personal computers (PC) 28, smart phones 29 or any other data processing capable device configured to download maps 15. Subscriber and publisher devices include map display software and graphical user interfaces operable to display maps of geographic regions and corresponding geospatial data.

Subscribers 30 may have access to communication links with server 12 via wireless or wired network access, public or private network, or other type of data link. The method of connection to the server by the client may be any well-known method of establishing a data connection. In an embodiment, subscribers 30 may be provided with access to one or more public or private mapping services 32.

A subscriber 30a may have access to all map sequences to a channel or may have access to only the most recently uploaded sequence. For example, a subscriber to Channel A may have access to both channel maps (Channel A, Sequence 1, Channel A, Sequence 2, Channel A, Sequence 3, and Channel A, Sequence 4) to obtain and view. In another example, a subscriber 30a may have access to only the most recent sequence upload, in this case, Channel A, Sequence 4.

In an embodiment, a subscriber 30a has privilege to monitor one or more channels, and the most recent map posted in that channel is loaded and presented to the subscriber 30a. A subscriber 30a may browse backward and forward through all prior postings to that channel. In an embodiment, a subscriber 30a to a channel receives new postings to that channel immediately as they occur. In an embodiment, subscriber 30a may review the previous postings to a channel by stepping backward or forward through the sequenced postings of the channel.

In an embodiment, a subscriber 30a monitoring a channel can receive new postings to that channel either through messaging or periodic polling of the table or list of channel content through the internet, identifying any new mapping contexts being added with a particular channel name. In an embodiment, the subscriber's access software or application automatically updates the map it is displaying without any user interaction when a new mapping context is made available to the channel.

In an embodiment, publishers 22 and subscribers 30 may access alternate mapping services independent from the mapping service 10. For example, publishers and subscribers may access Geographic Information System (GIS) data mapping services for map contexts independently. A publisher or subscriber may substitute GIS data sources and/or other mapping services into a map. For example, an alternate source for electric power data may be substituted into a map if a publisher or subscriber does not have access to the mapping service for electric power referenced in a mapping context.

In an embodiment, mapping system 10 may include the ability for a publisher or subscriber to browse national infrastructure sectors for the entire US including, but not limited to: airports, banking, broadcast, chemical, dams, electric power, fire stations, government, highways and bridges, hospitals, intermodal terminals, national icons, natural gas, nuclear power, nursing homes, petroleum, police stations, population, ports, rail, telecommunications—internet, telecommunications—wireless, telecommunications—wireline, etc. via appropriate mapping services.

In an embodiment, publishers and subscribers may browse basemaps or satellite imagery in context with any of the above infrastructure sectors, or others. Areas of interest may be loaded and reports generated on the included infrastructure or entities that lie geographically within the areas of interest. Publishers may place labels, legends and titles within a map to be included with other content parameters within a mapping context, and the entire mapping context can be published to a channel.

In an embodiment, the mapping system may operate in a collaborative mode, where one or more publishers can publish and monitor and/or one or more subscribers can publish and monitor. Collaboration mode provides two-way or each-to-all communication for those granted publishing and monitoring permissions. Any combination of publisher/subscriber roles or privileges can be created and assigned to yield any variant between purely single-publisher broadcast sharing and an anyone-publishes collaborative exchange.

Figure 2:
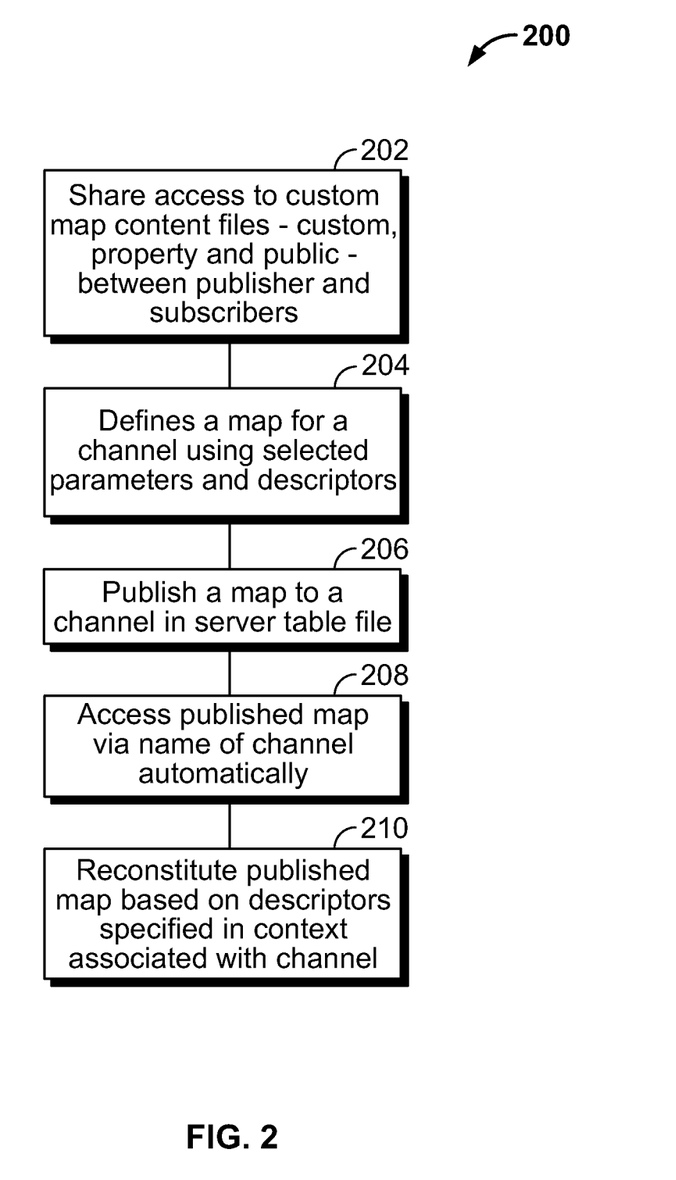
FIG. 2 shows an embodiment of a flow diagram for a method of providing a mapping system channel system according to the present invention.

FIG. 2 is a flow chart illustrating a method of operating a mapping system 200 according to an embodiment of the invention. At step 202, a mapping system exposes access (password protected or otherwise) to a mapping service(s), which may be a custom, propriety or public map data files or services accessible to publisher and subscribers, e.g., by posting the map data for proprietary or custom maps, or by simply pointing to a publicly available map data.

At step 204, a publisher authors or creates a map for a channel using available content from exposed mapping service(s). Publisher defines a map by identifying, inserting, and configuring all of the map content. A mapping context can then be created by encapsulating an enumeration of all references to sources, content, overlays, locations, zoom level, titles labels and their placement, and transparency as a group of parameters sufficient to reconstitute the a map remotely on another device using the parameters within the mapping context and pulling map data from any mutually accessible mapping services referenced in the mapping context.

At step 206, the publisher publishes the map to a channel in a table on server by commanding the mapping system to publish the map.

At step 208, a subscriber accesses the published map via name of channel and sequence number. The subscriber may access the published map automatically or may receive a message from the server or poll the channel monitored by the subscriber and downloading the map context 16 from the monitored channel.

At step 210, a subscriber running map display software, e.g., an application running on a browser on the subscriber device or a dedicated (i.e., not browser based) application, reconstitutes the published map from the parameters in the mapping context of the published map and accessing data from any mapping services referenced in the mapping context. It should be noted that a publisher, wishing to view its published map, downloads the map (as a subscriber) in the same manner as the subscriber above and similarly reconstitutes the map for viewing.

In one exemplary embodiment, a map may be shared independently of the channel system by embedding the mapping context parameters in a URL (uniform resource locator) defining GET parameters as follows:

https://<mapping system URL . . . >?
cent=<map center point values>
&scale=<scale value>
&base=<basemap value>
&satx=<satellite transparency value>
&cntx=<area of interest contour transparency value>
&cont=<area of interest contour reference> feature mapping service (vector values) that defines how to draw the hurricane, flood, etc. graphics or location values that
&sctr=<subject areas (sectors) to be included> list of mapping services to be included as layers in the map
&ttl=<title text>
&lbls=<list of label texts and their placement locations>
&lgnd=<legend placement>
where < > contains the values for the associated parameter, "mapping system URL" references the location of the mapping system application or web service, and parameter names which are immediately preceded by the "&" symbol represent mapping context parameters such as map center, scale, basemap reference, satellite transparency, contour transparency, reference to subject or sector mapping service overlays, title, labels and legend placement. All described above are concatenated and encoded into a single line of text without spaces to constitute a properly formatted URL string.

The complete definition of all of the content of even a simple map—e.g., all of the x, y coordinates to draw lines, closed polygons, colors, shading, etc.—may be a very large amount of data. In an embodiment, a map context may abstract all or some of the data details. Since applications are capable of referencing the same data sources or mapping services for various basemaps—e.g., street maps, topographical maps, satellite images, etc.—as well as subject-specific data sources—e.g., weather, facility locations, pipelines, structures, cables, etc.—and transient zones of interest, or mark-up and redlines—e.g., earthquake zone, flood zone, temporary presidential no-fly zone, fire evacuation zone—listing the content of a map by reference to the data the map comprises can be quite short.

Figure 4:
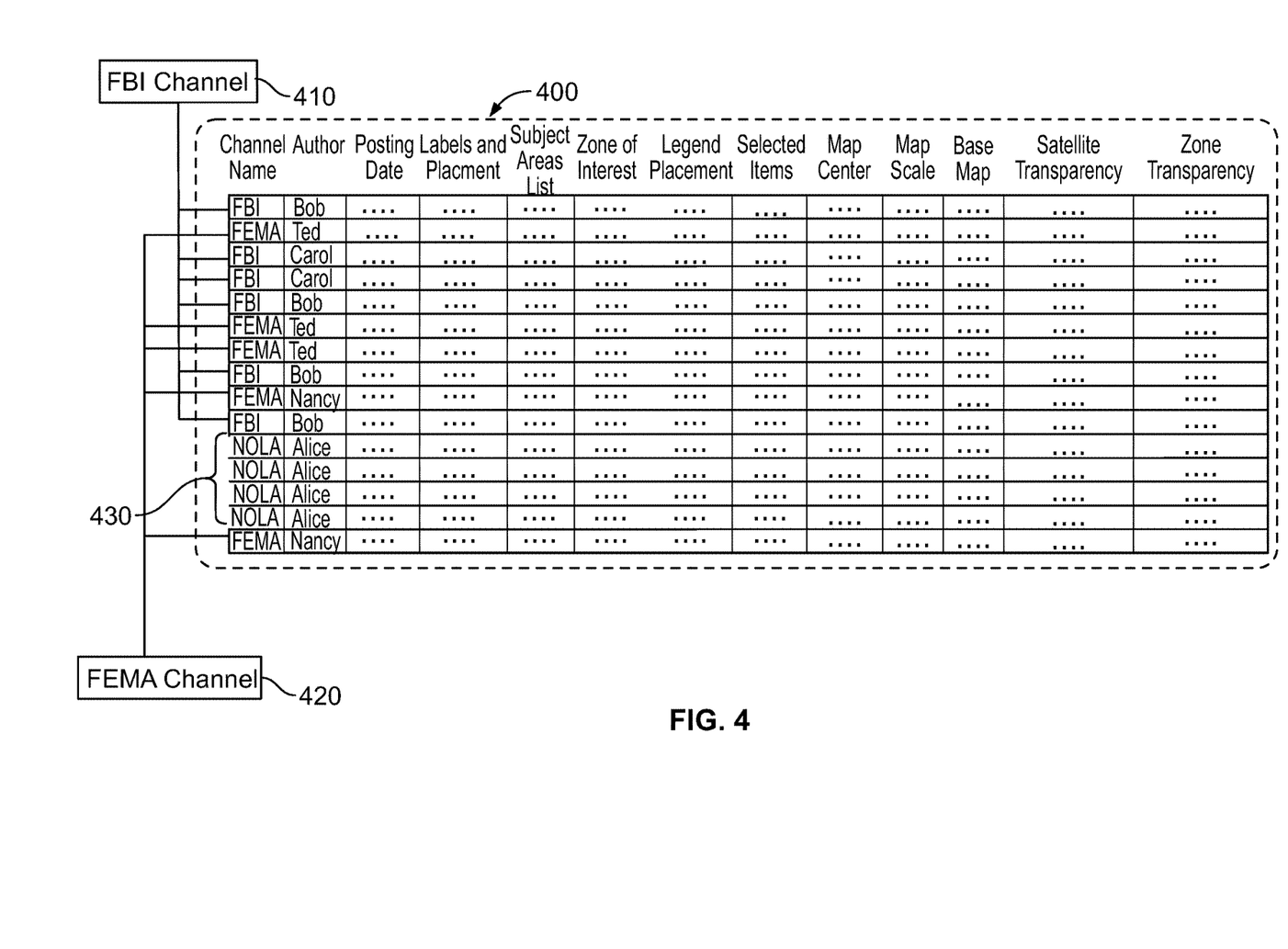
FIG. 4 shows an example of a table having mapping parameters installed into a list or rows, and further tagged with a unique ID, channel name, author, and posting date.

As discussed above, a map is defined as a set of parameters and code that define a map location and references to the content that should be included. Parameters can include but are not limited to:
Title
Labels and Placement
Referenced Subject Areas List Referenced Zones of Interest List
Legend Placement
Selected Items
Map Center X,Y
Map Scale
Referenced Base Maps
Transparency Values for:
Maps
Satellite
Zones of Interest
Other included mapping services or subject areas If these parameters simply reference mapping data sources or services, they can completely define the content and construction of a map with a very small amount of data. For example, the following parameters succinctly, quickly, and completely represent the map illustrated in FIG. 4:

Center=11670329, 4707332
Scale=72224
Basemap=Streets
Satellite Transparency=0.33
Zone of interest=Waldo Canyon Fire Zone
Zone Transparency=0.4
Subject Areas=Police, Fire, Hospitals, Nursing Homes
Title="Colorado Springs: Waldo Fire Concerns"
Labels=−11668663, 4702476, "This hospital no longer taking patients"
  −11661452, 4704276, "Bring new patients here"
  −11674685, 4714271 "Evacuate this nursing home"
Legend=52,749

Figure 3:
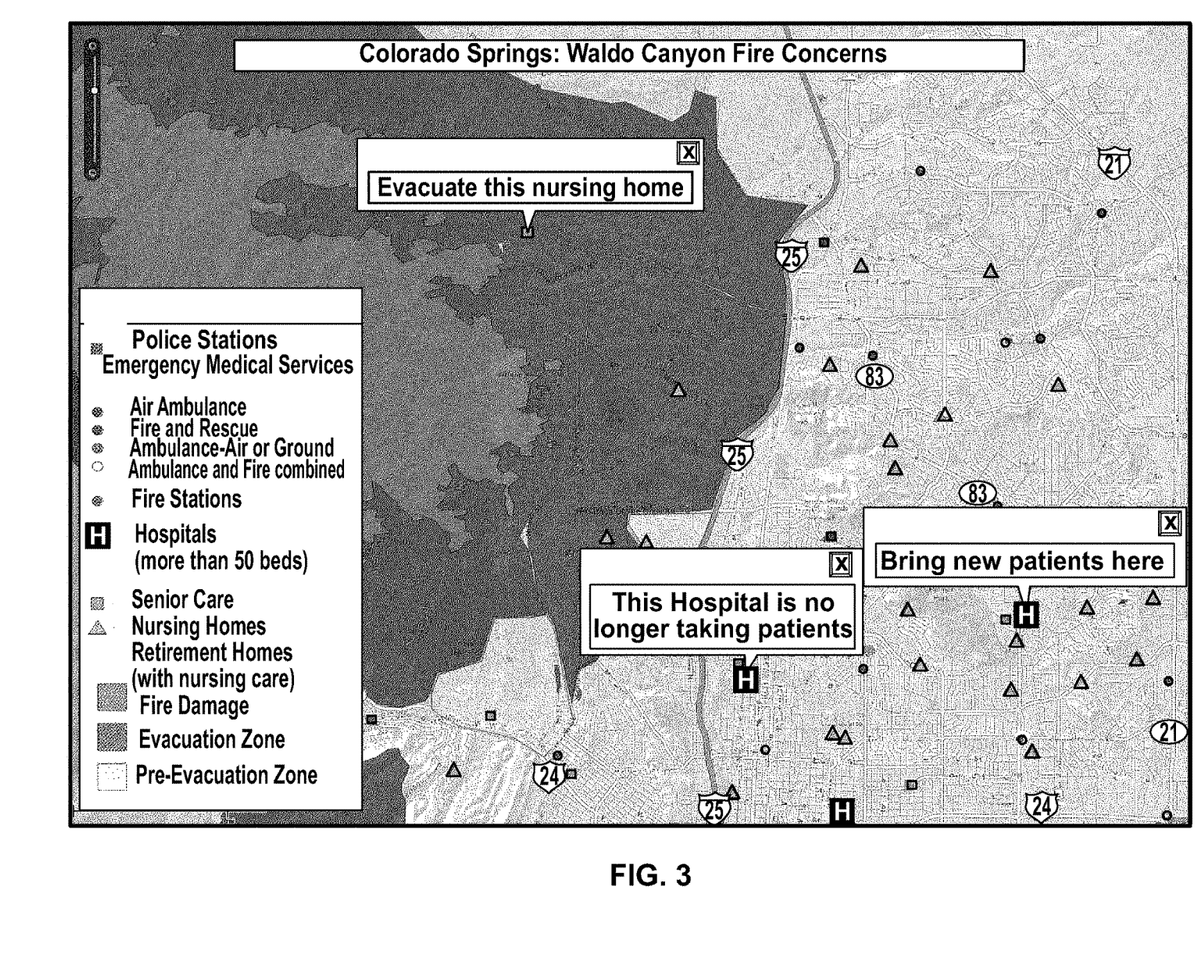
FIG. 3 illustrates an example of a map reconstituted by the method as shown in FIG. 2.

The above embodiment of a map allows for short, simple, and complete definition of the content of a map by referencing available mapping data or services. Rather than specifying each and every x,y coordinate for every single point, line, and zone, as well as style, color and transparency for each and every feature in a map, this mapping context concept simply references name, ID, or location of that map, layer, or zone. An example of a map reconstituted by using the method described above is shown in FIG. 3

FIG. 4 shows a table 400 where the above parameters that constitute mapping context are installed into rows, and further tagged with a unique ID, channel name, author, and posting date. According to this table, a collection of maps could be created and potentially ordered by posting date and grouped by author or by channel name. Table 400 includes a first FBI Channel 410 authored by Bob and Carol, and a FEMA Channel 420 authored by Ted and Nancy. Table 400 further includes a NOLA Channel 430 authored by Alice.

Figure 5:
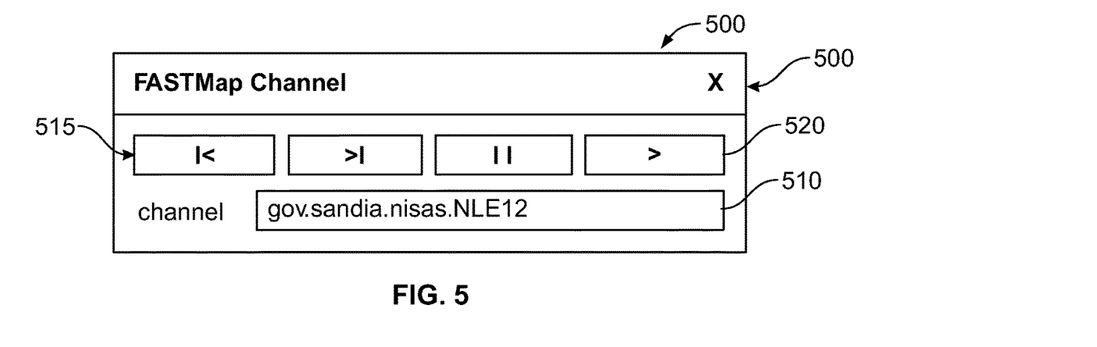
FIG. 5 shows an embodiment of a map display channel control window or pop-up box according to the present invention.

FIG. 5 shows an embodiment of a map display channel control window or pop-up box 500 according to the present disclosure. As can be seen in FIG. 5, the pop-up box 500 includes a channel field 510 for the user to enter or select the name of a channel, and selection buttons 515 including a monitor button 520 which the user may click to monitor the channel specified in the field 510. Selection buttons 515 may be used to allow the user to stop monitoring "‖", to step backward "‖<", or to step forward ">‖" through the series of ordered postings that have been previously posted to the selected channel.

When a message or poll recognizes a new mapping context has been posted to the channel list the subscriber can automatically retrieve the newly posted mapping context through the internet and automatically recreate the map from the parameters and references in the mapping context. The resulting behavior is that when a publisher or subscriber authors and publishes a map to a channel, it will immediately be recreated on each and every other subscriber's mapping application monitoring that channel wherever they are, worldwide automatically without any user interaction.

When a subscriber monitoring a channel receives a map through the channel, the subscriber' application software continues to support all functions of a dynamic map. Thus, the newly received map can be panned, zoomed, clicked on to query or identify objects, additionally the map can have content added or removed and may be further altered in any way. If the subscriber has publishing privileges, an altered version of the map can in turn be published back to the same channel or to another channel, and the new, altered version of the map is immediately posted and rendered on the screens of any and all other subscribers monitoring that channel. The number of subscribers to a channel is unlimited and available to any subscriber with access to the internet via wireline, WiFi, 3G, 4G or any other protocol for internet access. In this way, subscribers located anywhere can collaborate by posting and reposting updates or alterations to the maps, labels, titles, interest zones, and subject content.

Zones or areas of interest may be drawn or uploaded from common GIS formats such as shapefiles or Google Earth KMZ files, etc. and uploaded to updatable mapping services so they can be shared with other subscribers by reference through a published mapping context. The user (publisher or subscriber) may define rectangular zones or the zones may have an irregular shape. The user may draw the zones on the map through the application, or select zones bounding the area of interest from zones that are already available on the server system or from an existing shape file that can be uploaded to the server for sharing. In another embodiment shapes drawn by a user can be included directly in a mapping context as an ordered list of vertices incorporated as a mapping context parameter.

A shape file is a geospatial vector data format for geographic information systems software. The shape file format is known to those skilled in the art as an open specification for data interoperability among software products. Shape files describe geometries spatially, e.g. points, polylines, and polygons. Shape files, for example, may represent items such as water wells, rivers, and lakes, respectively. Each item may also have attributes that describe the items, such as the name or temperature. See, e.g., ESRI Shapefile Technical Description White Paper, July 1998, published by Environmental Systems Research Institute, Inc. of Redlands, Calif.

Figure 6:
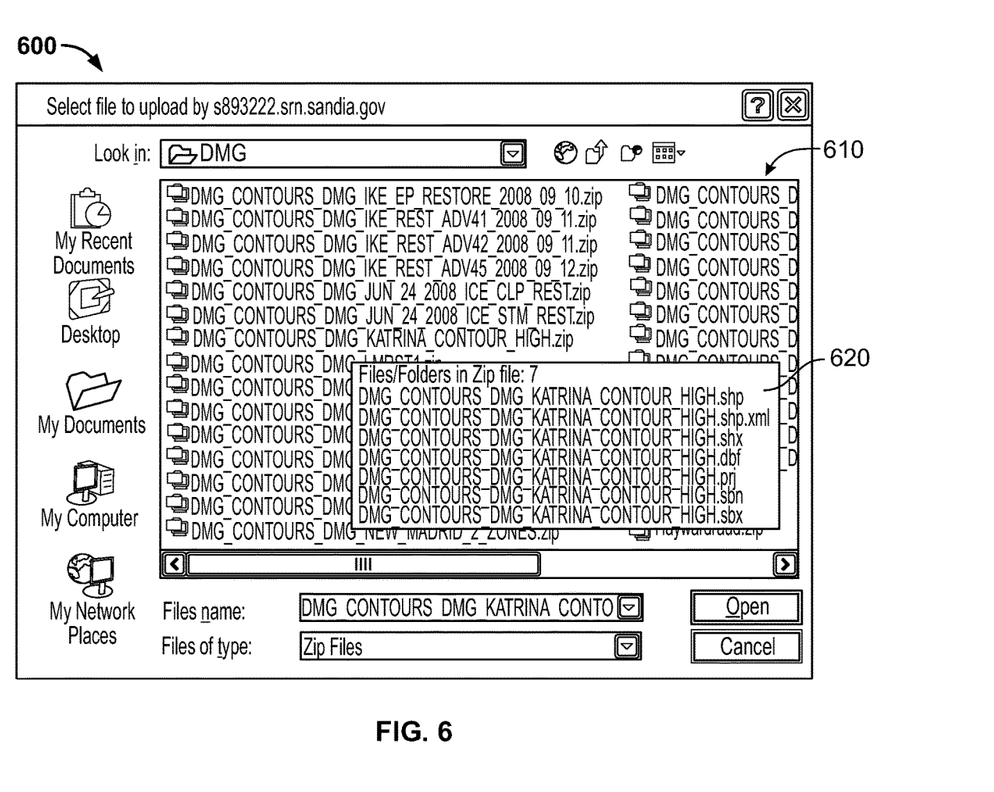
FIG. 6 is an illustration of an exemplary computer display including a list of files that a user might include in a map e.g. a hurricane contour according to the present invention.

FIG. 6 illustrates an exemplary illustration of a computer display 600 including a list of zipped shapefiles 610 including a list of files that a user might include in a map e.g. a hurricane contour according to the present invention. As can be seen in FIG. 6, all component files of a single shape file 620 can be associated, e.g., placed into a zip file 620, in order to provide a single input to mapping system 10 (FIG. 1). Mapping system 10 provides the ability to overlay the shape files from a local storage location onto a map being authored by the application. The application may include a selection element for the user to access local shape files on the user's computer system and select a zipped shapefile set 620.

Figure 7:
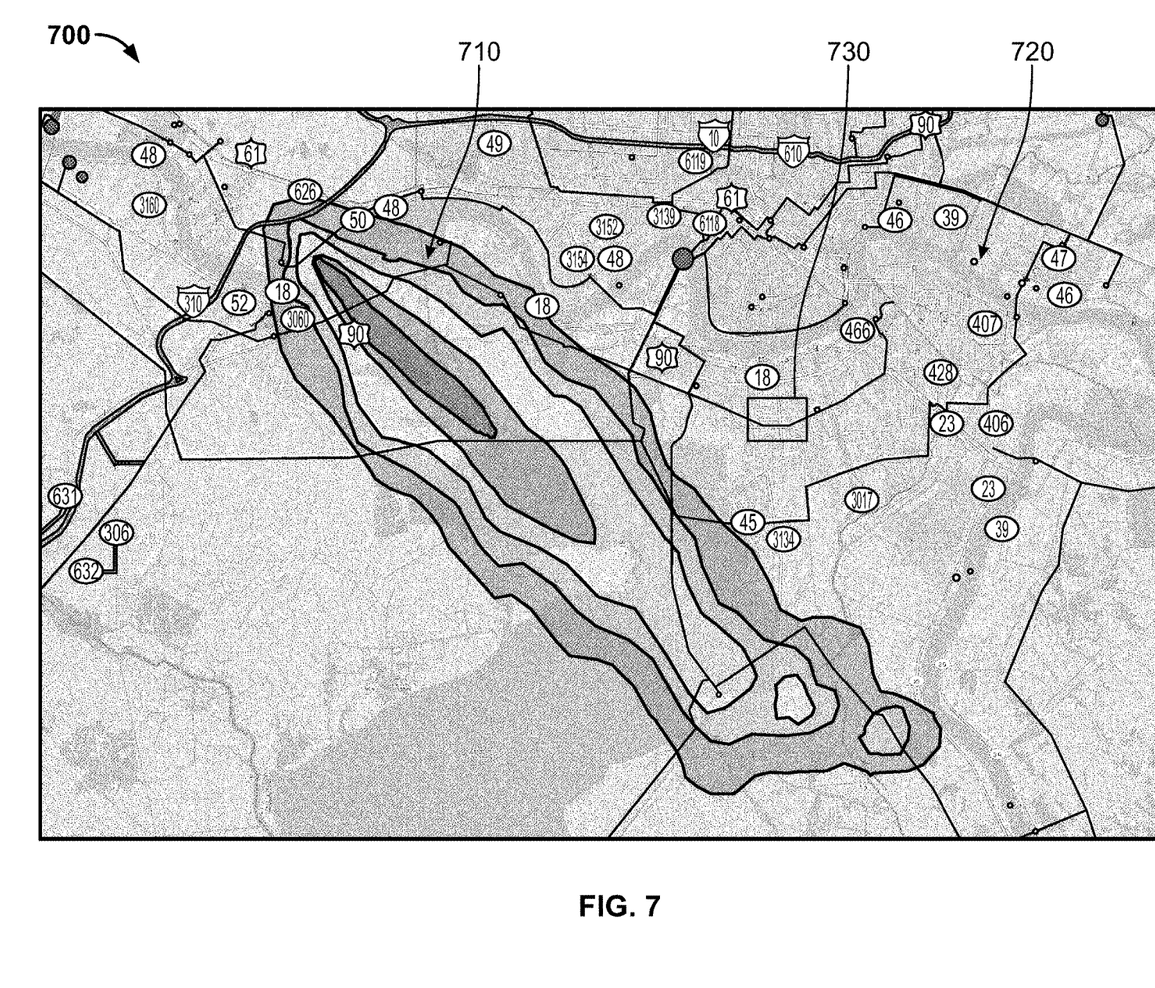
FIG. 7 illustrates an example of a map including a set of irregular semi-transparent zones overlaid on a base map generated by an embodiment of the invention.

FIG. 7 illustrates an example of a map 700 having a set of irregular semi-transparent zones 710 overlaid on a base map 720 generated by an embodiment of the invention. Each of the zones 710 is defined by a shape file set. In another embodiment, the transparency of one or more of the zones 710 may be adjustable ranging between fully transparent to opaque. Contours may be cleared or deleted from a map by the user. The mapping system 10 (FIG. 1) may use zones 710 to perform queries over an area of intersection with, e.g., subject area features such as various infrastructure features accessible from a mapping service. When zones 710 are loaded or drawn onto the map, the underlying features can be selected for inclusion in a report may be generated. Next, an order may be specified for each attribute of the contours to determine the order that the zones will be displayed in a map legend as well as the ordering of the zones in the report in which the selected features will be listed.

Figure 8:
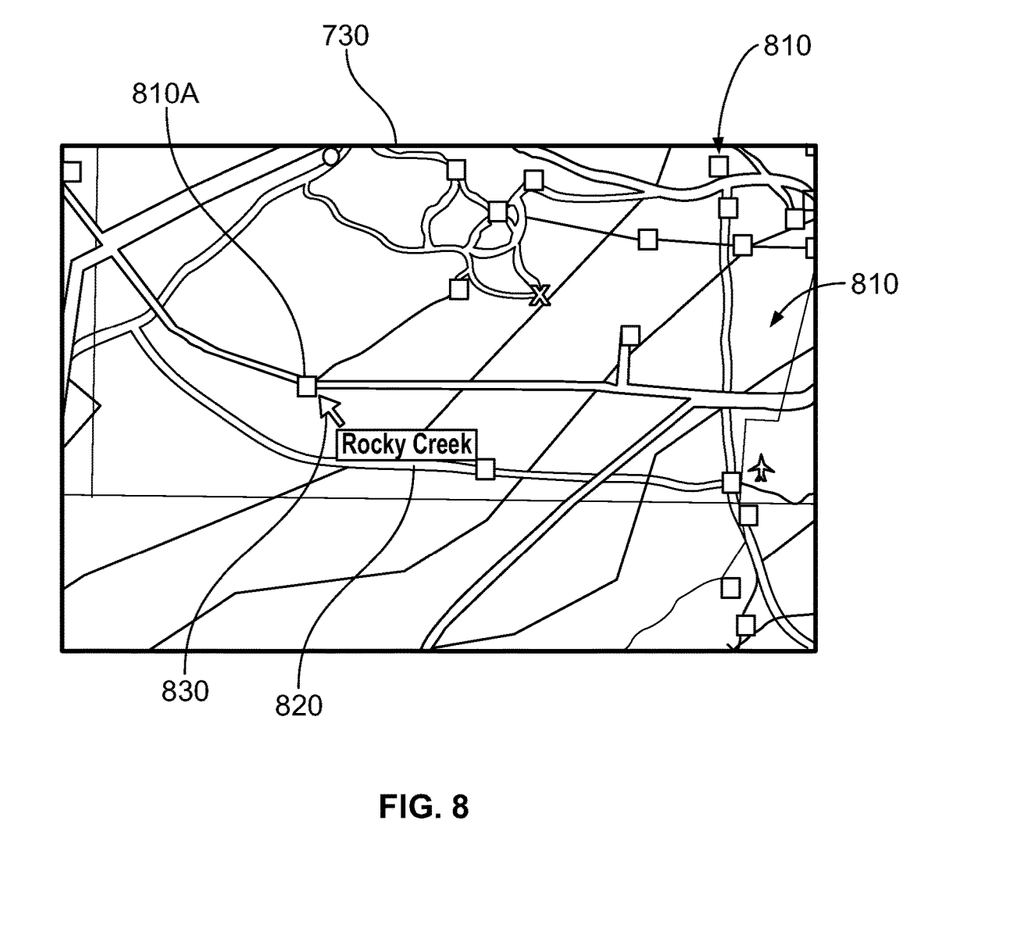
FIG. 8 illustrates an expanded view of a portion of FIG. 7.

FIG. 8 illustrates an expanded view of a portion 730 of FIG. 7. As can be seen in FIG. 8, selected assets 810 are marked with square icons. In another embodiment, selected assets may be marked with an icon and/or color marking, or could be color coded based on the asset type. Assets 810 may include textual information 820 such as labels or mouse hovering tool-tips and other descriptors, which may be displayed when a cursor 830 is placed over a selected asset 810A. In an embodiment, a user may request a report on assets falling within a zone 730 (FIG. 7). A selection element executes a web request forwarding identifiers for selected assets 810. In an embodiment, mapping system 10 (FIG. 1) may generate a report and display the report in a browser window.

Figure 9:
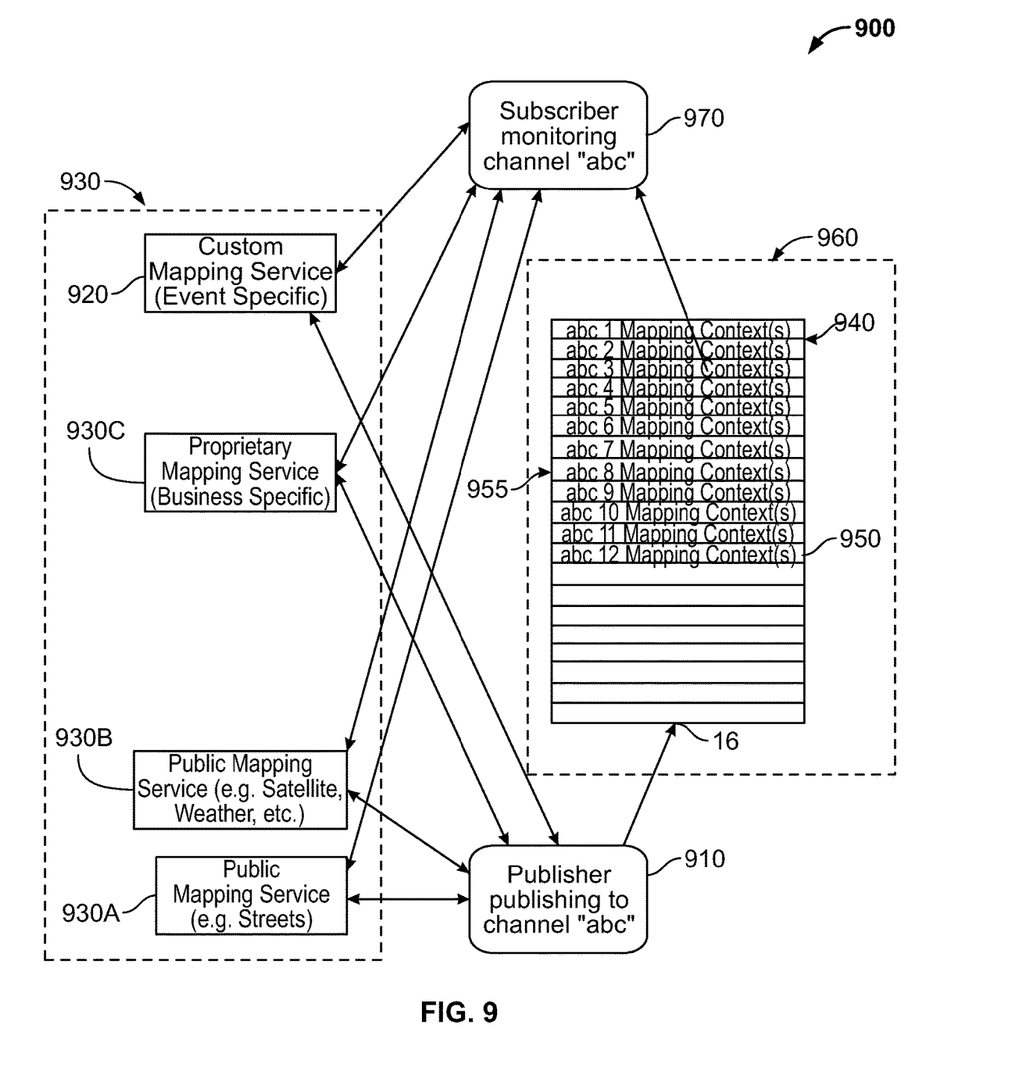
FIG. 9 shows an embodiment of a method for publishing maps according to the invention.

FIG. 9 shows another embodiment of a mapping system 900. A publisher 910 uploads mapping context in the form of zones of interest from a local shape file or other GIS data format to a custom mapping service 920. The custom mapping service 920 maintains event-specific geospatial data that can be shared and is accessible to other users that may not have a copy of the original shapefile or other GIS data. In an embodiment, the zones of interest may be polygons. The uploaded zones of interest may come from a local shapefile (not shown) or other GIS data.

The publisher 910 may also include additional mapping services from one or more additional public mapping services 930, in this case from a public street mapping service 930A and/or public weather mapping service 930B and/or a proprietary business mapping service 930C, in a map. Once the shape file or other GIS data is uploaded by the publisher 910, publisher 910 publishes a map 950 by uploading a mapping context to table 955 on server 960 describing the map 950 to be published, along with a channel name, in this case "abc", to table 955 that contains maps 940, which is an embodiment of Table 14 in FIG. 1, on server 960. Server 960 assigns a sequence number to the uploaded contexts based on a pre-arranged criteria (in this case, most recently published). The server 960 pushes the map published to channel "abc" in the form of a mapping context (a uniquely identified (channel and sequence) plus the associated mapping context parameters or descriptors) from channel "abc" to subscriber 970, who is monitoring channel "abc". The subscriber 970 uses installed software or web applications with the mapping contexts to reconstitute the map by pulling the mapping information from the mapping services 930. In one embodiment, there may be more than one subscriber monitoring channel "abc" and receiving and reconstituting maps from the sever 960 as described herein.

In one embodiment, a tablet version of the mapping application may be placed on machine readable media, e.g., a compact disk (CD) or made available in an online app store or other means of distribution of the application. The mapping application includes machine executable code that enables the operation of the application on that device plus any necessary data and/or configuration instructions. In another embodiment, the delivery method for a Web version of the application may be performed dynamically, e.g., directly from the web site immediately when a user accesses the web site. The web version may be, e.g., an Adobe Flash® application. Flash applications may be instantly and automatically acquired from the web server hosting the web page and run inside a browser.

It is important to note that the construction and arrangement of the mapping system as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system. As noted above, embodiments within the scope of the present application include program products comprising machine-readable, non-transitory, fixed media for carrying or having machine-executable instructions or data structures stored thereon. This also includes any web applications which may be delivered from a web site and run within a web browser such as Adobe Flash® or Microsoft Silverlight®. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It is noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

What is claimed is:

1. A method of publishing a map, comprising:
   providing access to one or more map data sources or mapping services that provide mapping information that provides content for a map to at least one publisher;
   publishing a map by uploading a map comprising mapping information comprising descriptors comprising a channel name and parameters that reference map content and map to a file or database server by the at least one publisher;
   assigning a map sequence number to the map based on the order of arrival of the map at the at least one publisher;
   accessing the published map having an assigned map sequence number by at least one subscriber; and
   downloading the map having the assigned map sequence number by the at least one subscriber,
   wherein the map is assigned a channel that includes the assigned map sequence number and associated map; and
   wherein the channel is communicated by the at least one publisher to a subscriber of the at least one subscriber; and
   wherein the assigned map sequence number and associated map is sequentially available to the at least one subscriber sequentially through the channel.

2. The method of claim 1, wherein the file or database server assigns the assigned map sequence number to the map.

3. The method of claim 1, wherein parameters include at least one of a map center point, a map extent, a map scale, a zoom level, a basemap, a reference maps, a map subject, a label, a title, a legend, a map feature property, a map attribute, a contours of interest, GIS data and a transparency values.

4. The method of claim 1, wherein the map context further comprises a map subject, the map subject comprising at least one of electric power grid, natural gas network, houses for sale, police car locations, weather, people or asset locations et al.

5. The method of claim 1, wherein the map context further comprises transparency values, the transparency value comprising at least one of satellite view, contours, and map features.

6. The method of claim 1, further comprising referencing in the map context Geographic Information System (GIS) data, and accessing the GIS data directly by the subscriber for the associated channel through a mapping service which is mutually accessible between the publisher and the subscriber; and reconstituting the map by the subscriber based on the mutually accessible GIS data.

7. The method of claim 1 further comprising communicating the map context from a publisher to a server, and to a subscriber via the server, and reconstituting the map associated with the map context by the subscriber based on the descriptors or parameters in the associated map context and mutually accessible data.

8. The method of claim 1, further comprising the step of publishing is carried out by a single publisher, and wherein the at least one subscriber comprises a plurality of subscribers.

9. The method of claim 1, wherein the at least one publisher comprises a plurality of publishers, and the at least one subscriber comprises a plurality of subscribers.

10. The method of claim 8, wherein the plurality of subscribers may be configured to collaboratively modify the map and publish a new map to the server on a channel.

11. The method of claim 1, wherein the step of providing access to a plurality of map data files comprises posting a map data for proprietary or custom maps, to a mutually accessible location or mapping service.

12. The method of claim 1, wherein the step of providing access to a plurality of map data files comprises pointing via a uniform resource locator (URL) to a publicly available map data or mapping services.

13. A mapping system for disseminating a map context between users, comprising:
    a server for maintaining a table containing at least one map context, the server in data communication with at least one publisher and at least one subscriber; the at least one publisher configured to upload the at least one map context,
    the at least one publisher and the at least one subscriber in data communication with one or more mapping services;
    the server configured to receive and transmit the at least map context to the at least one subscriber;
    the map context comprising parameters and descriptors required to recreate the map, and the map context used to recreate a map by the at least one subscriber to display the map based on the map context;
    the server assigning a map sequence number to the at least one map context based on the order of arrival of the map at the at least one publisher;
    wherein the at least one publisher is configured to define at least one channel comprising one or more map contexts in the table; and
    wherein the channel is communicated by the at least one publisher to selected subscribers of the at least one subscriber; and wherein the channel is modifiable by a user and the channel as modified is traceable sequentially by the at least one subscriber through each modification that creates a new, sequential map sequence number for the map context to the channel.

14. The system of claim 12, wherein each of the at least one publisher and the at least one subscriber is configured to acquire maps, satellite imagery, and other geospatial functions by accessing mapping services or other mapping data referenced by a URL, web, IP address, or other reference means.

15. The system of claim 13, wherein the map context comprises context definitions for the associated channel.

16. The system of claim 13, wherein the channel comprises a sequence of mapping context descriptors for the associated channel.

17. The system of claim 13, wherein the at least one publishers and the at least one subscribers comprises computer devices.

18. The system of claim 17, wherein the computer devices are selected from the group comprising: laptop computer, tablet computer, personal computer or cellular telephone with data communication links to the server.

19. The system of claim 13, wherein the server data communication comprises wired or wireless data link.

20. The system of claim 13, further comprising one or more shape files stored locally on one of the publisher or subscribers, the shape file configured to overlay onto the map.

21. The system of claim 20, wherein the shape file is selectable by a user, the shape file comprising an irregular zone or other GIS data displayed semi-transparently over a base map of the map and including content from the mapping services with the base map and subject content features visible beneath the zone or in context with other said GIS data.

22. The system of claim 20, wherein that the shape file data is uploaded to an updatable mapping service that is mutually accessible to publishers and subscribers.

23. The system of claim 20, wherein a publisher and/or subscriber has the ability to browse forward and backward through ordered postings of a channel.

* * * * *